United States Patent [19]
Kawamura

[11] Patent Number: 5,617,986
[45] Date of Patent: Apr. 8, 1997

[54] APPARATUS FOR FEEDING SCANNED MEDIUM

[75] Inventor: Yoshinori Kawamura, Kanagawa-ken, Japan

[73] Assignee: Fuji Photo Film Co., Ltd., Kanagawa, Japan

[21] Appl. No.: 410,284

[22] Filed: Mar. 24, 1995

[30] Foreign Application Priority Data

Mar. 31, 1994 [JP] Japan ................................ 6-063274

[51] Int. Cl.$^6$ .................... G03B 1/56; G03B 27/58; B65H 20/00
[52] U.S. Cl. ...................... 226/91; 226/155; 226/183; 226/190; 355/47
[58] Field of Search ................. 226/154, 183, 226/190, 155, 119, 91, 189; 355/47, 29

[56] References Cited

U.S. PATENT DOCUMENTS

| | | | |
|---|---|---|---|
| 2,051,036 | 8/1936 | Foster et al. | 226/91 X |
| 2,051,787 | 8/1936 | Foster | 226/91 X |
| 3,512,694 | 5/1970 | Sugaya et al. | 226/91 |
| 3,669,331 | 6/1972 | Renold | 226/183 X |
| 4,833,496 | 5/1989 | Hall | 226/189 X |
| 5,103,322 | 4/1992 | Beck et al. | 355/47 X |
| 5,181,066 | 1/1993 | Ozawa et al. | 355/29 |

FOREIGN PATENT DOCUMENTS

| | | |
|---|---|---|
| 0069384A3 | 1/1983 | European Pat. Off. . |
| 0456954A3 | 11/1991 | European Pat. Off. . |
| 0574916 | 12/1993 | European Pat. Off. ........... 226/183 |

*Primary Examiner*—Michael Mansen
*Attorney, Agent, or Firm*—Sughrue, Mion, Zinn, Macpeak & Seas

[57] ABSTRACT

A feed apparatus for feeding a film has a pair of presser guide members for pressing a film F against an outer circumferential surface of a feed drum, a pair of upstream and downstream guide plates for guiding the film F, and a moving mechanism for moving a pair of nip rollers toward and away from the feed drum. When the film F is scanned by a light beam, the film F is tautly held against the outer circumferential surface of the feed drum. The moving mechanism has first and second displacing mechanisms actuatable in synchronism with vertical movement of the nip rollers toward and away from the feed drum for displacing the presser guide members and the upstream and downstream guide plates toward and away from the feed drum.

3 Claims, 7 Drawing Sheets

APPARATUS FOR FEEDING SCANNED MEDIUM

BACKGROUND OF THE INVENTION

1. Field of the Invention:

The present invention relates to an apparatus for feeding a scanned medium in an auxiliary scanning direction by gripping the scanned medium with a feed drum which is rotated and nip rollers associated with the feed drum.

2. Description of the Related Art

Recording apparatuses for recording images on scanned media have been widely used. In such recording apparatuses, a light beam emitted from a light beam generator is applied through a light beam deflector and a scanning lens to scan a scanned medium in a main scanning direction, and the scanned medium is fed in an auxiliary scanning direction by an auxiliary scanning feed mechanism for recording an image on or reading an image from the scanned medium.

The auxiliary scanning feed mechanism usually employs a rotating feed drum, and nip rollers movable toward and away from the feed drum, for feeding the scanned medium in the auxiliary scanning direction.

While the scanned medium is being held against an outer circumferential surface of the feed drum by the nip rollers, the scanned medium often tends to sag due to gravity or flexure thereof. When the scanned medium sags, it is floated or curved off the outer circumferential surface of the feed drum, resulting in a feed error being produced or, on occasion, the lines recorded on the scanned medium by the application of a light beam being unduly curved.

When color-separated films of four colors, i.e., cyan, magenta, yellow, and black (C, M, Y, BK) are to be produced using such an auxiliary scanning feed mechanism in a color platemaking process, if the films suffer respective feed errors caused by the auxiliary scanning feed mechanism, then respective images on the films are out of register with each other when superimposed, resulting in a reduction in register accuracy.

It has been the practice in the color platemaking process to place four color-separated images in one plate, sever the color-separated images after the plate has been produced, and use the color-separated images in superimposed relation to each other. In such a practice, it is important that a positional error (absolute positional error) of any individual dot on one film be in an allowable range.

SUMMARY OF THE INVENTION

It is therefore an object of the present invention to provide an apparatus of simple arrangement which is capable of feeding a scanned medium very accurately with a feed drum and nip rollers while the scanned medium is being held in taut contact with an outer circumferential surface of the feed drum.

To achieve the above object, there is provided in accordance with the present invention a feed apparatus for feeding a scanned medium in an auxiliary scanning direction while a light beam is being deflected and applied to the scanned medium in a main scanning direction substantially perpendicular to the auxiliary scanning direction, comprising a feed drum rotatable for feeding the scanned medium in the auxiliary scanning direction, a pair of nip rollers disposed upstream and downstream, respectively, of the feed drum in the auxiliary scanning direction for holding the scanned medium against an outer circumferential surface of the feed drum, a pair of presser guide members disposed upstream and downstream, respectively, of the feed drum in the auxiliary scanning direction, each for pressing the scanned medium against the outer circumferential surface of the feed drum at a position spaced a greater distance from a position where the light beam is applied to the scanned medium than a position where each of the nip rollers is held against the feed drum, a pair of guide plates disposed upstream and downstream, respectively, of the feed drum in the auxiliary scanning direction for guiding the scanned medium, and a moving mechanism for moving the nip rollers toward and away from the feed drum, the moving mechanism comprising first displacing means for moving the presser guide members toward and away from the feed drum in synchronism with movement of the nip rollers toward and away from the feed drum, and second displacing means for moving the guide plates out of positions interfering with the presser guide members, respectively, in synchronism with movement of the nip rollers toward and away from the feed drum.

When the nip rollers are moved toward the feed drum by the moving mechanism to grip the film against the feed drum, the first displacing means operates to move the presser guide members toward the outer circumferential surface of the feed drum for thereby pressing the scanned medium against the outer circumferential surface of the feed drum, and the second displacing means operates to move the guide plates out of the positions interfering with the presser guide members, respectively. The scanned medium can now be fed smoothly by the feed drum and the nip rollers while being tautly maintained on the outer circumferential surface of the feed drum by the presser guide members, and hence is prevented from being possibly floated or curved off the feed drum. Consequently, the scanned medium on the feed drum can be scanned highly accurately by the light beam. Furthermore, the feed apparatus has a relatively simple arrangement.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
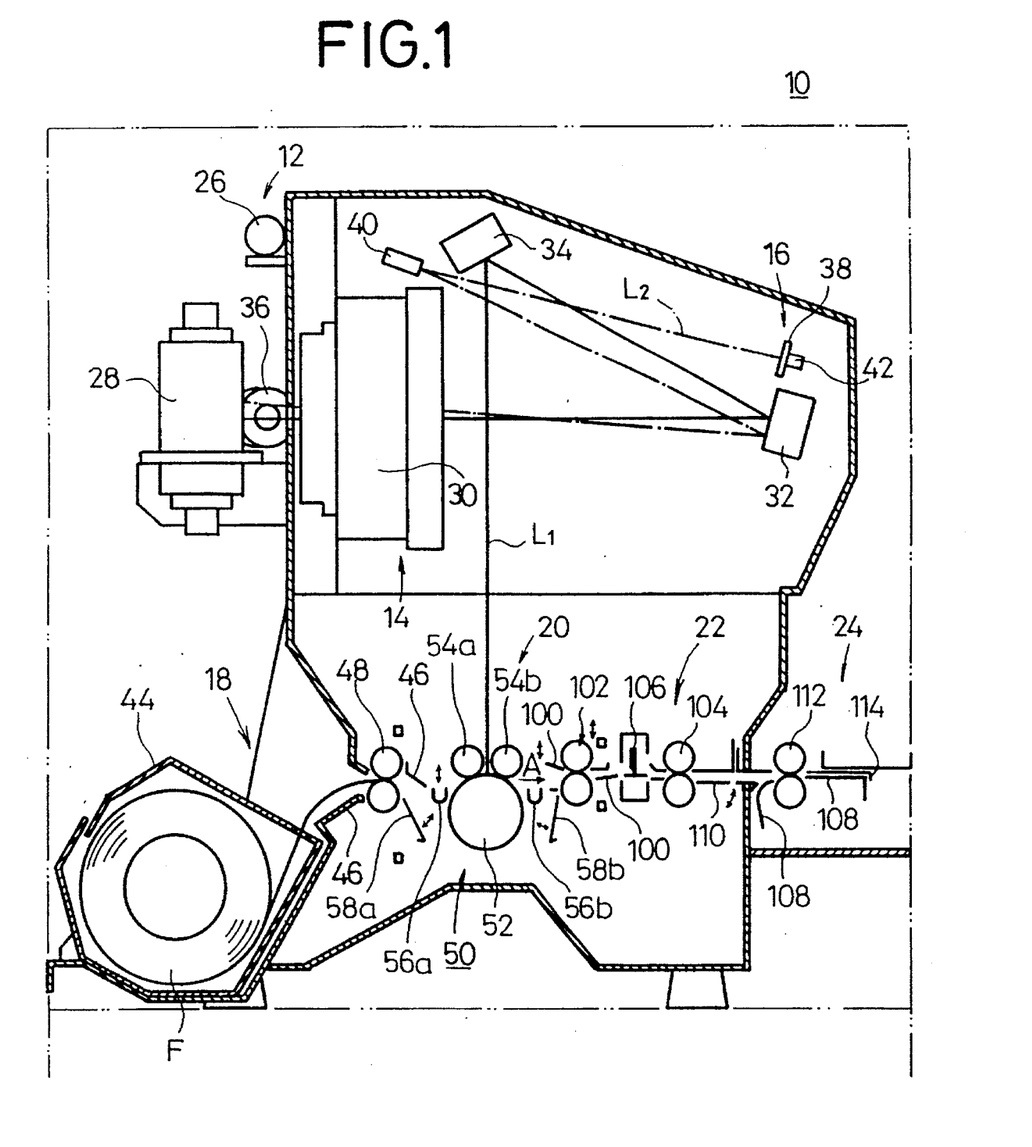
FIG. 1 is a schematic elevational view, partly in cross section, of a recording apparatus which incorporates a feed apparatus according to the present invention.

FIG. 1 shows a recording apparatus 10 which incorporates a feed apparatus according to the present invention. The recording apparatus 10 is typically used to produce color-separated films of four colors, i.e., cyan, magenta, yellow, and black (C, M, Y, BK). The recording apparatus 10 generally comprises a light beam generator 12 for emitting a recording light beam $L_1$ such as a laser beam or the like, a scanning optical system 14 for scanning a film (scanned medium) F in a main scanning direction with the recording light beam $L_1$ emitted from the light beam generator 12, a synchronizing signal generator 16 for generating a synchronizing signal for controlling the position of the recording light beam $L_1$, a film supply unit 18 for unwinding the film F from a film roll, a recorder 20 for recording an image on the film F from the film supply unit 18, a film feeder and cutter 22 for feeding and cutting the film F with the image recorded thereon to a predetermined length, and a discharger 24 for delivering the cut film F to an image developing apparatus (not shown).

The light beam generator 12 has a recording light source 26 such as an He—Ne laser or the like for emitting the recording light beam $L_1$. The scanning optical system 14 has a resonant light deflector 28 for reflecting and deflecting the recording light beam $L_1$ generated by the light beam generator 12 in the main scanning direction, an fθ lens 30 as a scanning lens, and a pair of reflecting mirrors 32, 34 for applying the recording light beam $L_1$ that has passed through the fθ lens 30 onto the film F in the recorder 20.

The synchronizing signal generator 16 has a synchronizing light source 36 for generating a synchronizing light beam $L_2$, a reference grating 38 having a plurality of slits (not shown) for being scanned by the synchronizing light beam $L_2$ emitted from the synchronizing light source 36, a reflecting mirror 40 for leading the synchronizing light beam $L_2$ reflected by the reflecting mirror 32 toward the reference grating 38, and a photosensor 42 for photoelectrically reading the synchronizing light beam $L_2$ that has passed through the reference grating 38.

The film supply unit 18 has a magazine 44 for storing the roll of film F, a plurality of guide plates 46 for guiding the film F unwound from the magazine 44, and a first pair of feed rollers 48 for gripping the leading end of the film F and feeding the film F toward the recorder 20.

The recorder 20 has a feed apparatus 50 according to the present invention for feeding the film F in an auxiliary scanning direction (indicated by the arrow A) substantially perpendicular to the main scanning direction.

Figure 2:
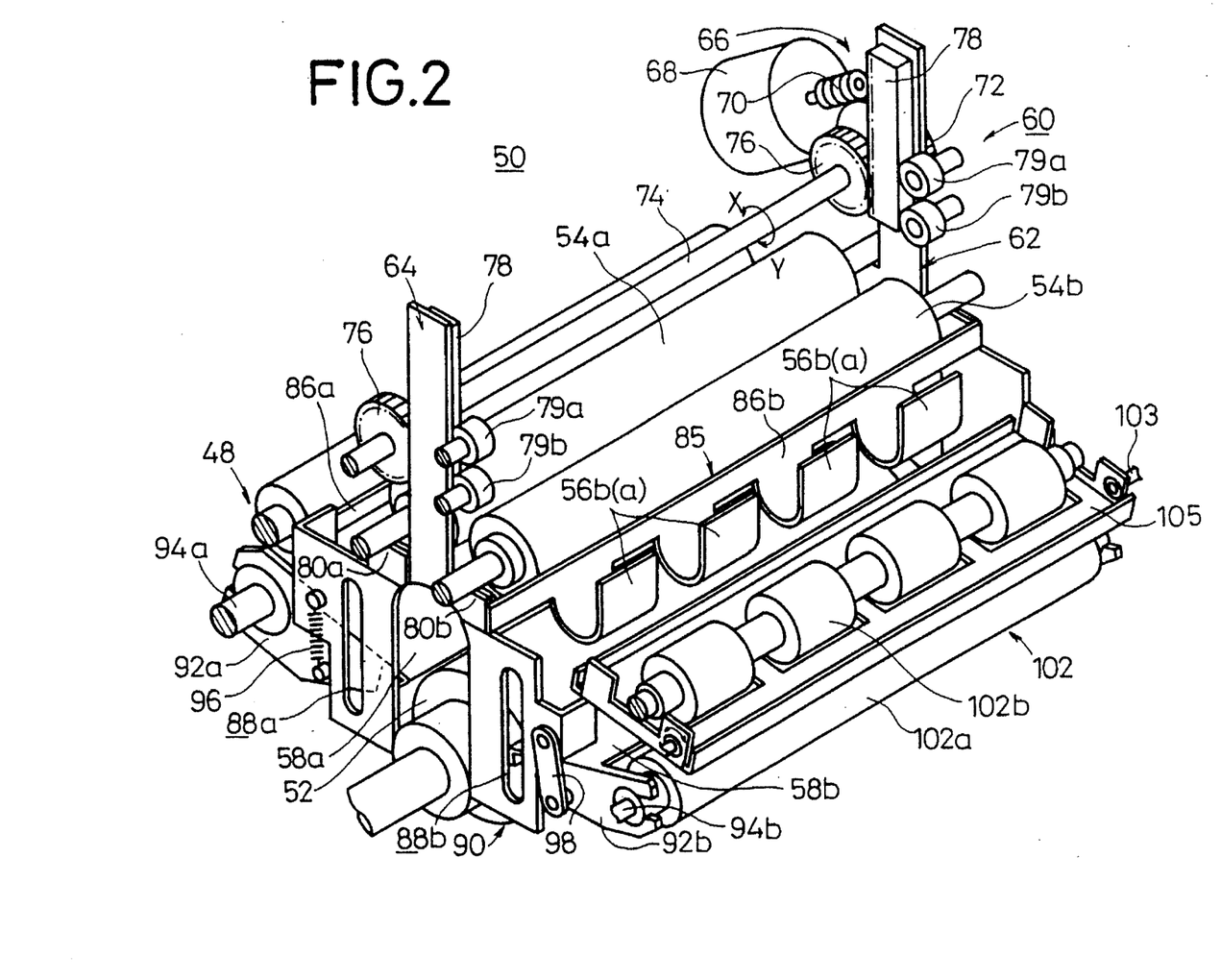
FIG. 2 is a perspective view of the feed apparatus.
Figure 3:
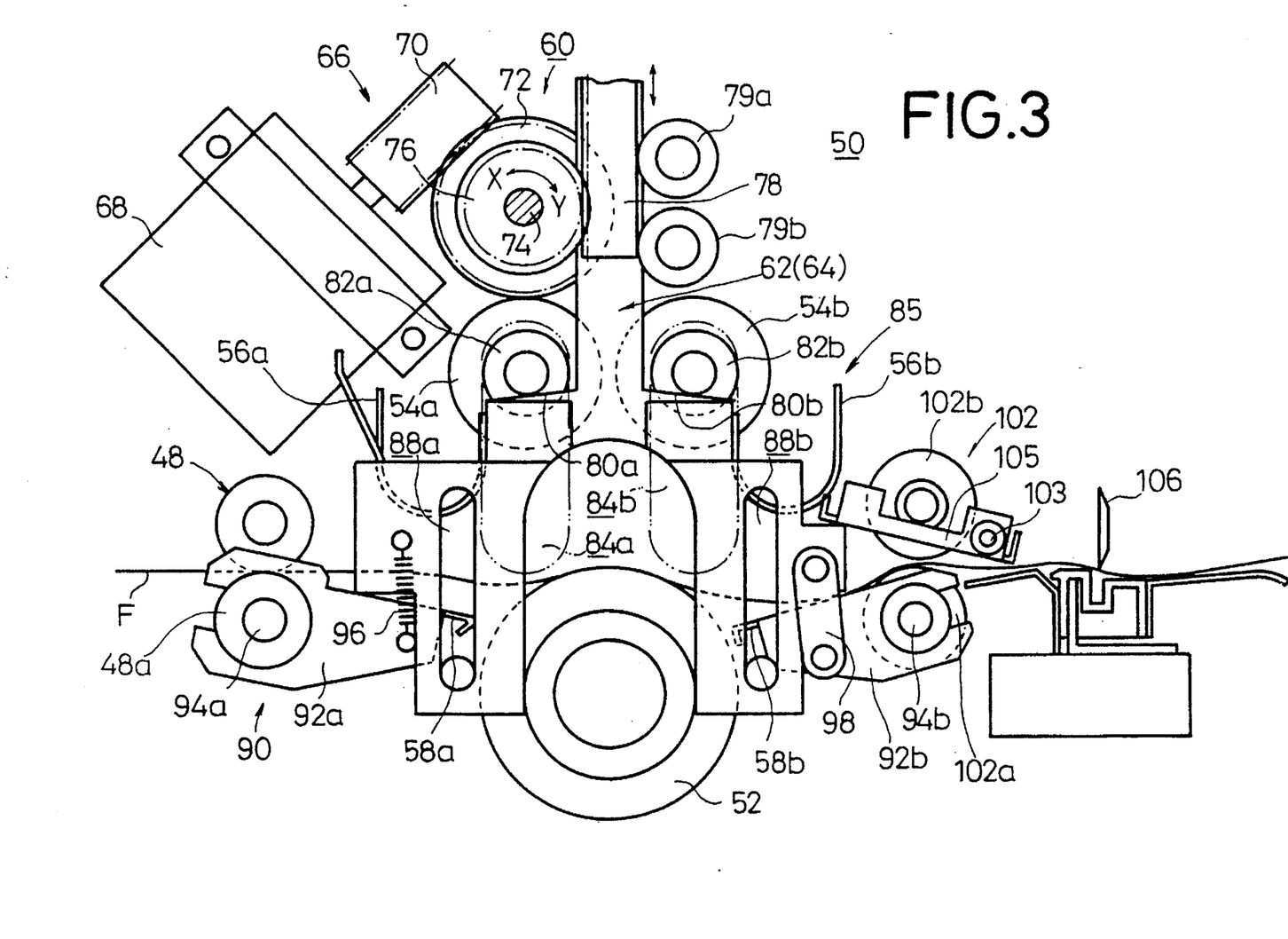
FIG. 3 is a front elevational view showing the manner in which the feed apparatus operates.
Figure 4:
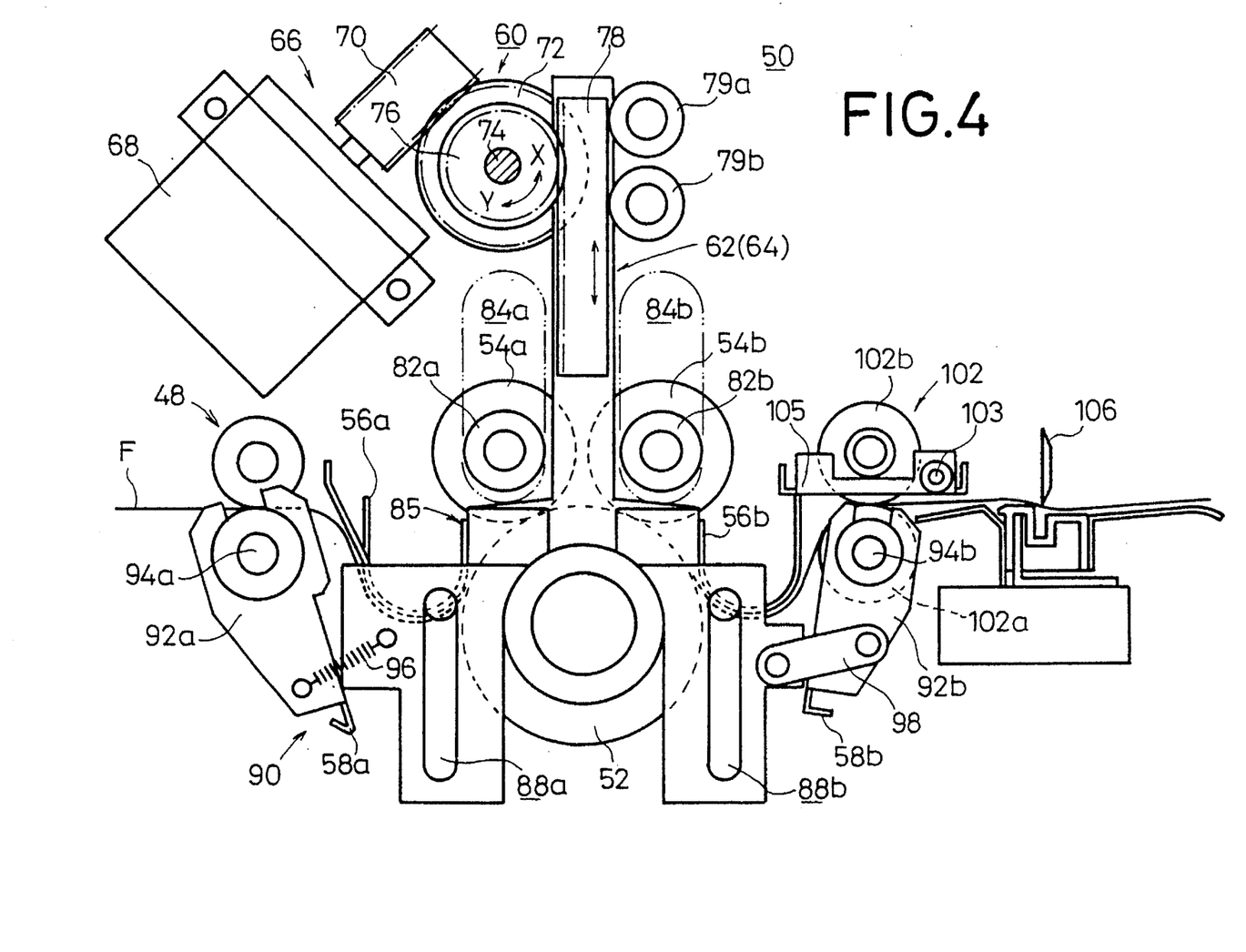
FIG. 4 is another front elevational view showing the manner in which the feed apparatus operates.

As shown in FIGS. 2 through 4, the feed apparatus 50 comprises a feed drum 52 of relatively large diameter, a pair of nip rollers 54a, 54b disposed above and movable toward and away from the feed drum 52, a pair of sets of presser guide members 56a, 56b for pressing the film F against an outer circumferential surface of the feed drum 52 at positions that are more spaced from the position where the recording light beam $L_1$ is applied to the feed drum 52 than the positions where the nip rollers 54a, 54b are held against the feed drum 52, a pair of upstream and downstream guide plates 58a, 58b disposed respectively upstream and downstream of the feed drum 52 in the direction in which the film F is fed, for guiding the film F, and a moving mechanism 60 for moving the nip rollers 54a, 54b toward and away from the feed drum 52.

As shown in FIG. 2, the moving mechanism 60 comprises a pair of brackets 62, 64 spaced a distance from each other along the feed drum 52 and disposed parallel to each other, and an actuator 66 for vertically moving the brackets 62, 64 in unison with each other. The actuator 66 comprises a stepping motor 68 having a drive shaft with a worm 70 fixed thereto. A worm gear 72 held in mesh with the worm 70 is secured to an end of a rotatable shaft 74 on which a pair of axially spaced spur gears 76 is mounted. The spur gears 76 are held in mesh with respective racks 78 that are affixed to upper end portions, respectively, of the brackets 62, 64. The racks 78 are supported by guide rollers 79a, 79b.

The bracket 62 is in the form of a plate having a bifurcated lower end and includes a pair of shoulders 80a, 80b near the bifurcated lower end for placing ends of the nip rollers 54a, 54b. As shown in FIG. 3, the shoulders 80a, 80b are inclined downwardly in outward directions. The nip rollers 54a, 54b placed on the respective shoulders 80a, 80b are supported by outer wall surfaces of vertically oblong guide grooves 84a, 84b through respective bearings 82a, 82b that are mounted on the ends of the nip rollers 54a, 54b.

A first displacing means 85 comprises a pair of plates 86a, 86b having ends fixed to the bracket 62 closely to the shoulders 80a, 80b. The presser guide members 56a, 56b, which are of an arcuately curved shape and spaced at certain intervals, extend from the plates 86a, 86b.

The bifurcated lower end of the bracket 62 has a pair of vertically elongate holes or slots 88a, 88b defined therein. A second displacing means 90 is disposed for angularly moving the upstream and downstream guide plates 58a, 58b in unison with movement of the nip rollers 54a, 54b toward and away from the feed drum 52 to switch between a straight feed path and a looped feed path.

The second displacing means 90 has a pair of upstream and downstream swing plates 92a, 92b disposed upstream and downstream, respectively, of the feed drum 52. The upstream swing plate 92a has an end swingably supported on a shaft 94a of a drive roller 48a of the first pair of feed rollers 48, and a spring 96 engaging the other end of the upstream swing plate 92a is connected to the bifurcated lower end of the bracket 62. The upstream swing plate 92a is engaged by the bracket 62 for being held in a certain attitude, and is fixed to one end of the upstream guide plate 58a. The downstream swing plate 92b has an end swingably supported on a shaft 94b of a drive roller 102a of a second pair of feed rollers 102 (described later on). A link 98 engaging the other end of the downstream swing plate 92b is angularly movably mounted on the bifurcated lower end of the bracket 62. The downstream swing plate 92b is fixed to one end of the downstream guide plate 58b.

The bracket 64 and various components associated therewith are identical in structure to those described above, and parts thereof which are identical to those of the bracket 62 and various associated components are denoted by identical reference numerals, and will not be described in detail below.

As shown in FIG. 1, the film feeder and cutter 22 comprises a plurality of guide plates 100, a second pair of feed rollers 102 and a third pair of feed rollers 104 which are spaced a distance from each other, and a cutter unit 106 disposed between the second pair of feed rollers 102 and the third pair of feed rollers 104. The second pair of feed rollers 102 has a drive roller 102a (as described above) and a driven roller 102b.

As shown in FIGS. 2 and 3, the driven roller 102b engages a substantially intermediate portion of a swing guide plate 105 which has an end supported by a pivot shaft 103 for angular movement about the pivot shaft 103. The other end of the swing guide plate 105 is engageable with the bifurcated lower ends of the brackets 62, 64. The swing guide plate 105 is swingable in synchronism with vertical movement of the brackets 62, 64 for displacing the driven roller 102b toward and away from the drive roller 102a.

The discharger 24 has a plurality of guide plates 108, a movable guide plate 110, a fourth pair of feed rollers 112, and a shutter 114 for selectively opening and closing a path which leads to the image developing apparatus.

Operation of the recording apparatus 10 in relation to the feed apparatus 50 will be described below.

Figure 5:
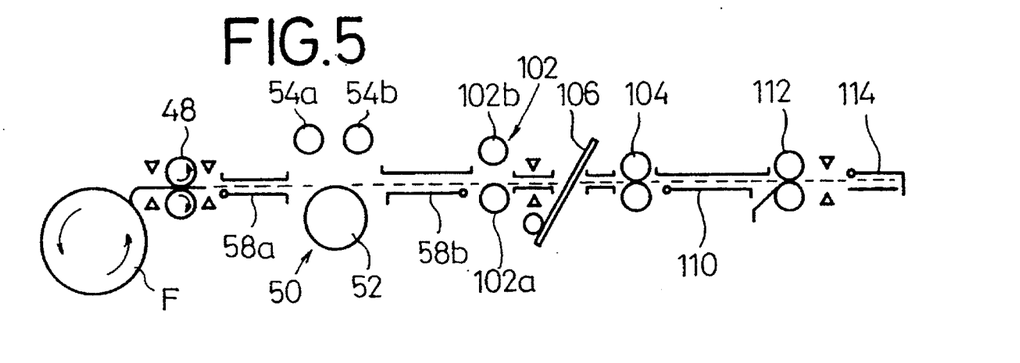
FIG. 5 is a schematic elevational view showing the manner in which the feed apparatus starts to operate.

The film F in the form of a roll is stored in the magazine 44, and the leading end of the film F is gripped by the first pair of feed rollers 48 (see FIG. 5). The nip rollers 54a, 54b are moved away from the feed drum 52, and the driven roller 102b of the second feed roller pair is moved away from the drive roller 102a thereof.

Specifically, as shown in FIG. 2, the stepping motor 68 is energized to rotate in one direction, causing the worm 70 and the worm gear 72 to rotate the shaft 74 in the direction indicated by the arrow X. The spur gears 76 mounted on the shaft 74 are rotated to elevate the racks 78 and hence the brackets 62, 64. The nip rollers 54a, 54b placed on the shoulders 80a, 80b of the brackets 62, 64 are lifted away from the feed drum 52, and the presser guide members 56a, 56b are also spaced away from the feed drum 52 by the plates 86a, 86b which are fixed to the brackets 62, 64.

The upstream swing plate 92a is angularly moved upwardly about the shaft 94a under the tension of the springs 96 until the upstream guide plate 58a is held in a substantially horizontal attitude, and the downstream swing plate 92b is caused by the links 98 to swing upwardly about the shaft 94b until the downstream guide plate 58b is held in a substantially horizontal attitude (see FIG. 3). The ascending movement of the bracket 62 turns the swing guide plate 105 upwardly about the shaft 103, so that the driven roller 102b supported on the swing guide plate 105 is spaced upwardly from the drive roller 102a.

Figure 6:
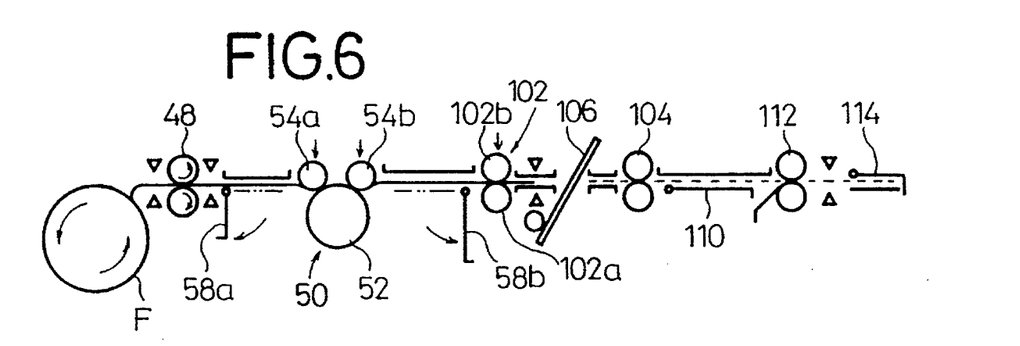
FIG. 6 is a schematic elevational view showing the manner in which the feed apparatus unwinds a film.

When the film F is unreeled from the magazine 44 by the first pair of feed rollers 48, the leading end of the film F passes between the second pair of feed rollers 102 into a certain position whereupon, as shown in FIG. 6, the driven roller 102b is displaced toward the drive roller 102a and the nip rollers 54a, 54b move toward the feed drum 52.

Specifically, the stepping motor 68 is energized to rotate in the opposite direction, rotating the shaft 74 in the direction indicated by the arrow Y. The brackets 62, 64 are lowered, and the nip rollers 54a, 54b are moved toward the feed drum 52, gripping the film F. The presser guide members 56a, 56b descend to press the film F against the outer circumferential surface of the feed drum 52. The upstream and downstream swing plates 92a, 92b are angularly moved downwardly about the respective shafts 94a, 94b, displacing the upstream and downstream guide plates 58a, 58b downwardly out of a position interfering with the respective presser guide members 56a, 56b, as shown in FIG. 4. Now, looped paths are defined upstream and downstream, respectively, of the feed drum 52. The swing guide plate 105 is angularly moved downwardly, and hence the driven roller 102b is moved downwardly into coaction with the drive roller 102a for thereby gripping the film F therebetween.

Figure 7:
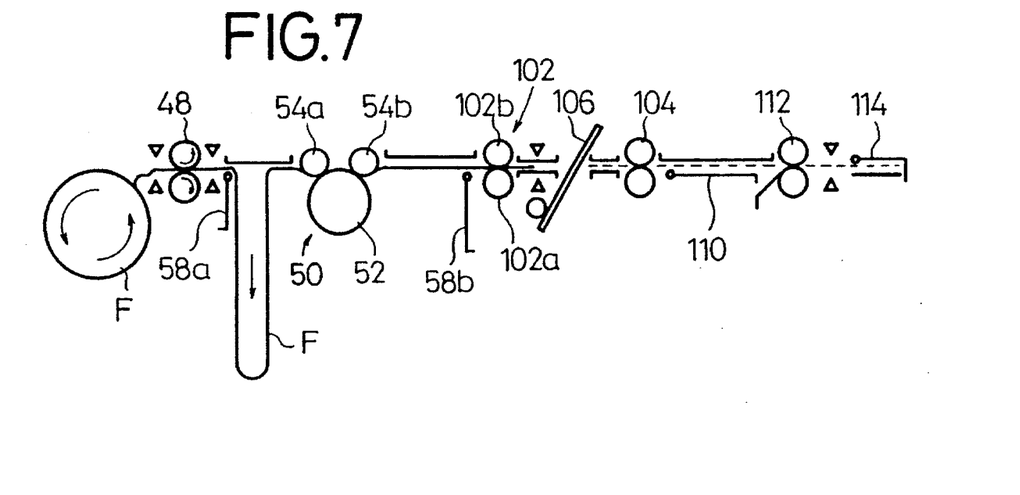
FIG. 7 is a schematic elevational view showing the manner in which the feed apparatus unwinds a film by a recording length.

When the film F is moved toward the recorder 20 upon rotation of the first pair of feed rollers 48, since the upstream guide plate 58a has been retracted downwardly, a certain length of the film F, which is determined in view of a required recording length, is drawn downwardly as a loop between the feed drum 52 and the first pair of feed rollers 48, as shown in FIG. 7. The first pair of feed rollers 48 is now stopped against rotation, and the feed drum 52 is rotated at a relatively low speed clockwise in the direction indicated by the arrow (see FIG. 8). The film F is now fed in the auxiliary scanning direction indicated by the arrow A while being gripped between the nip rollers 54a, 54b and the feed drum 52.

When the synchronizing light source 36 is energized, it emits a synchronizing light beam $L_2$. The synchronizing light beam $L_2$ is reflected and deflected in a main scanning direction by the resonant light deflector 28, and then is caused by the fθ lens 30 and the reflecting mirrors 32, 40 to scan the reference grating 38. The synchronizing light beam $L_2$ passes through the slits of the reference grating 38, and is applied as a pulsed light signal to the photosensor 42. The photosensor 42 then generates a synchronizing signal which is applied to energize the recording light source 26. The recording light source 26 generates a recording light beam $L_1$, which after being modulated by an image to be recorded, is reflected and deflected in the main scanning direction by the resonant light deflector 28. The recording light beam $L_1$ passes through the fθ lens 30 and is reflected by the reflecting mirrors 32, 34 to scan the film F which is being fed in the auxiliary scanning direction A. Therefore, an image is two-dimensionally recorded on the film F based on the image information carried by the recording light beam $L_1$.

Figure 8:
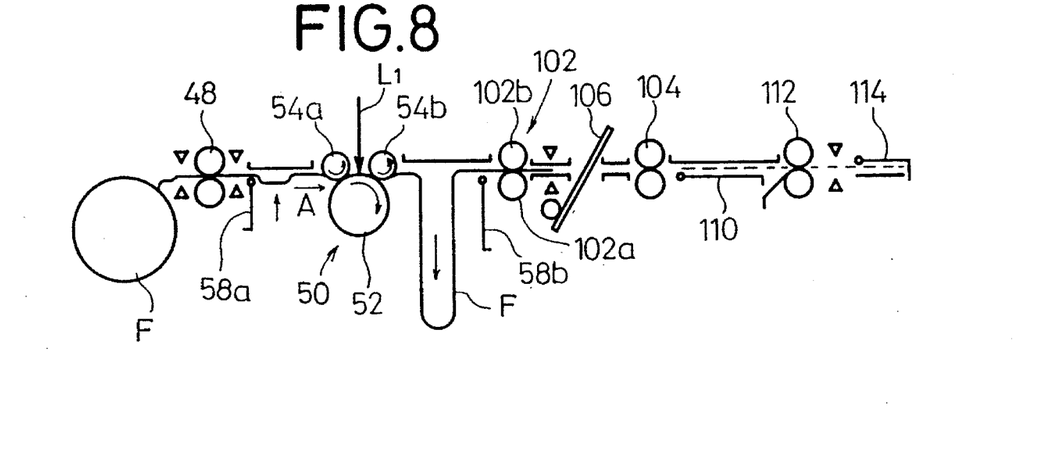
FIG. 8 is a schematic elevational view showing the feed apparatus in which an image is to be recorded on the film.
Figure 9:
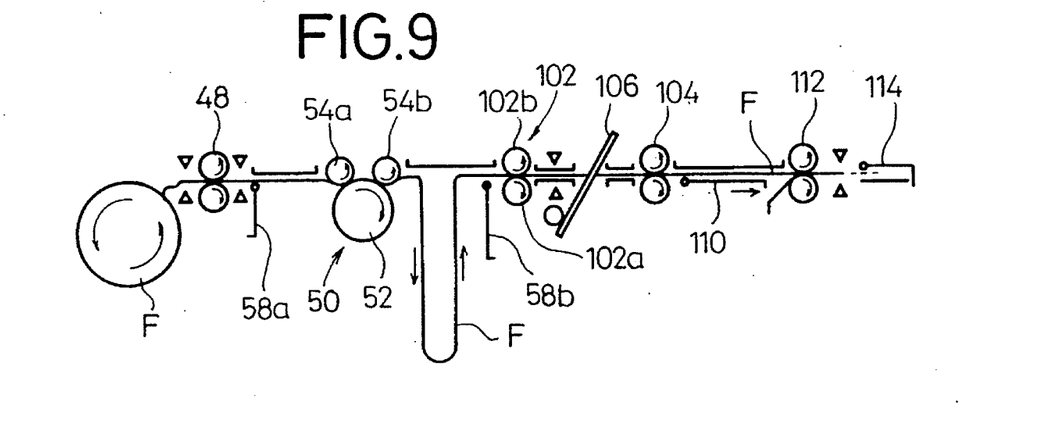
FIG. 9 is a schematic elevational view showing the feed apparatus in which the image has been recorded on the film.

When the image has been recorded on the film F as described above, the recorded length of film F is accommodated as a loop between the second pair of feed rollers 102 and the feed drum 52, as shown in FIG. 8. After the image recording process is finished, the first pair of feed rollers 48, the feed drum 52, the second pair of feed rollers 102, the third pair of feed rollers 104, and the fourth pair of feed rollers 112 are rotated to feed the film F until its leading end reaches a certain position near the shutter 114, as shown in FIG. 9.

Figure 10:
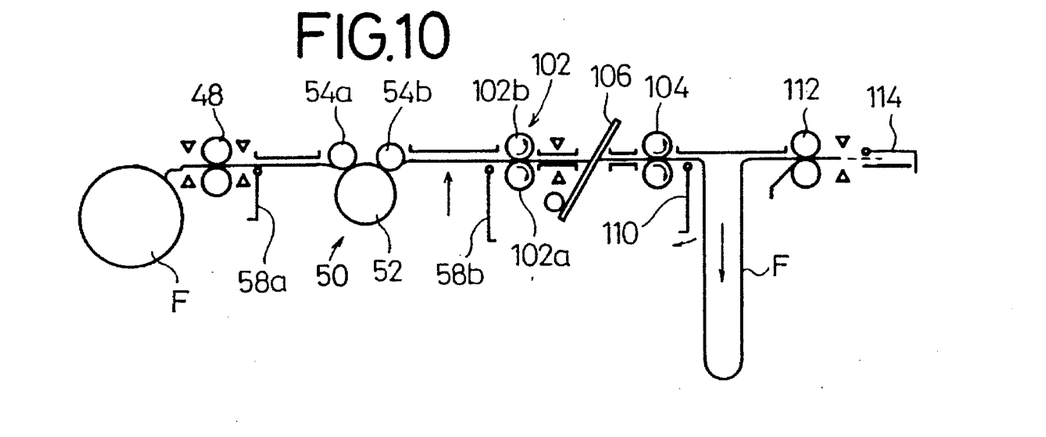
FIG. 10 is another schematic elevational view showing the feed apparatus in which the image has been recorded on the film.
Figure 11:
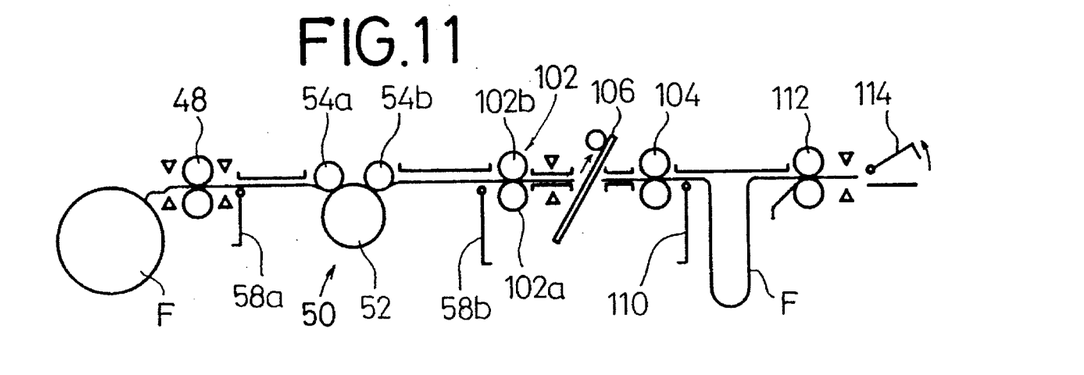
FIG. 11 is a schematic elevational view showing the feed apparatus in which the film with the recorded image is cut off.
Figure 12:
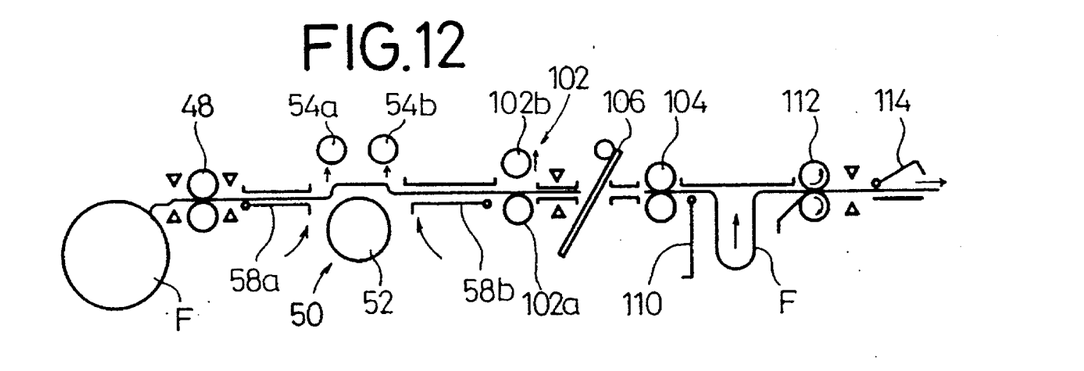
FIG. 12 is a schematic elevational view showing the manner in which the feed apparatus feeds the film with the recorded image toward an image developing apparatus.

Then, as shown in FIG. 10, the movable guide plate 110 is lowered, and the second pair of feed rollers 102 and the third pair of feed rollers 104 are rotated to accommodate the recorded length of film F, which has been accommodated between the second pair of feed rollers 102 and the feed drum 52, as a loop between the third pair of feed rollers 104 and the fourth pair of feed rollers 112. The cutter 106 is actuated to cut off the film F to a predetermined length (see FIG. 11), and the shutter 114 is opened to allow the recorded length of film F to be fed toward the image recording apparatus by the fourth pair of feed rollers 112, as shown in FIG. 12. At the same time, the nip rollers 54a, 54b and the driven roller 102b are elevated, the presser guide members 56a, 56b are elevated, and the upstream and downstream guide plates 58a, 58b are turned to a substantially horizontal attitude, by ascending movement of the brackets 62, 64 (see FIG. 3)

Figure 13:
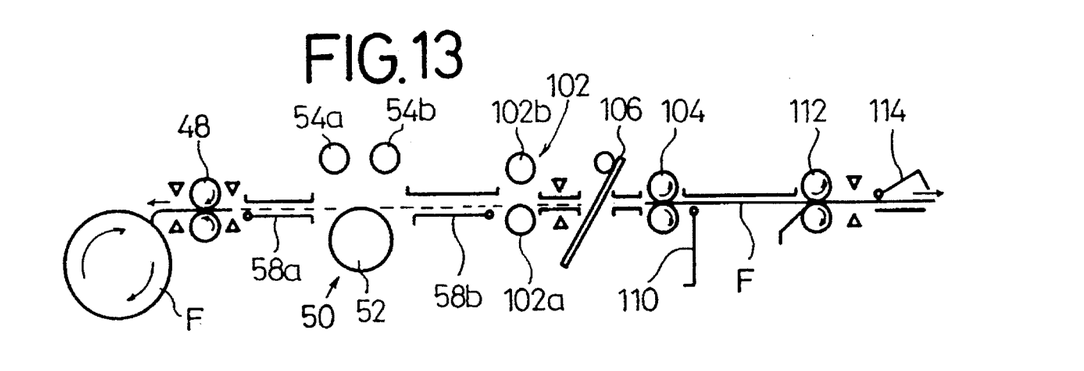
FIG. 13 is a schematic elevational view showing the manner in which the feed apparatus feeds the film with the recorded image toward an image developing apparatus and returns an unrecorded portion of the film.

The first pair of feed rollers 48 is reversed to return the unrecorded film F toward the magazine 44, and the third pair of feed rollers 104 and the fourth pair of feed rollers 112 are rotated to introduce the recorded length of film F into the image recording apparatus, as shown in FIG. 13. The shutter 114 is then closed. The parts of the feed apparatus 50 are now in the condition shown in FIG. 5 in readiness for a next recording process.

In the illustrated embodiment, when the recording light beam $L_1$ is applied to the film F, the film F is gripped between the feed drum 52 and the nip rollers 54a, 54b, and held against the outer circumferential surface of the feed drum 52 by the presser guide members 56a, 56b that are positioned outwards of the nip rollers 54a, 54b. Therefore, the film F is tautly wound around the outer circumferential surface of the feed drum 52 over a certain angular interval without being possibly floated or curved off the outer circumferential surface of the feed drum 52. Consequently, lines recorded on the film F are prevented from being unduly curved or otherwise distorted.

At the time the film F is pressed against the outer circumferential surface of the feed drum 52 by the presser guide members 56a, 56b, the upstream and downstream guide plates 58a, 58b are swung downwardly thereby to define looped feed paths. Consequently, the presser guide members 56a, 56b and the upstream and downstream guide plates 58a, 58b are prevented from interfering with each other, avoiding the application of any undue external forces to the film F. Images can thus be recorded smoothly and highly accurately on the film F.

Furthermore, the nip rollers 54a, 54b can be moved toward and away from the feed drum 52, the presser guide members 56a, 56b can be moved toward and away from the feed drum 52, the upstream and downstream guide members 58a, 58b can be angularly moved, and the driven roller 102b can be moved toward and away from the drive roller 102a, all in mechanical unison with each other in response to vertical movement of the brackets 62, 64 of the moving mechanism 60. The overall mechanical arrangement for carrying out such movements is much simpler than would be if they were moved under electrical control, and makes it possible to record images highly accurately and efficiently on the film F.

While the presser guide members 56a, 56b are shown as being of an arcuately curved shape in the illustrated embodiment, they may be replaced with guide rollers. The feed apparatus 50 has been described with respect to a color platemaking process for producing four color-separated films. However, the principles of the present invention are also applicable to a process of recording an image on a single film for black-and-white platemaking, or a process of recording images of four colors on a single film for color platemaking and dividing the film into four plates. The feed apparatus 50 may be incorporated in a reading apparatus in which a light beam is applied to a film with image information recorded thereon to photoelectrically read the recorded image information from the film.

Although a certain preferred embodiment of the present invention has been shown and described in detail, it should be understood that various changes and modifications may be made therein without departing from the scope of the appended claims.

What is claimed is:

1. In a recording apparatus where a light beam is deflected and applied to a scanned medium, a feed apparatus for feeding the scanned medium in an auxiliary scanning direction while the light beam is being deflected and applied to the scanned medium in a main scanning direction substantially perpendicular to the auxiliary scanning direction, comprising:

a feed drum rotatable for feeding the scanned medium in the auxiliary scanning direction;

a pair of nip rollers disposed upstream and downstream, respectively, of said feed drum in the auxiliary scanning direction for holding the scanned medium against an outer circumferential surface of said feed drum;

a pair of presser guide members disposed upstream and downstream, respectively, of said feed drum in the auxiliary scanning direction, each for pressing the scanned medium against said outer circumferential surface of said feed drum at a position spaced a greater distance from a position where the light beam is applied to the scanned medium than a position where each of said nip rollers is held against the feed drum;

a pair of guide plates disposed upstream and downstream, respectively, of said feed drum in the auxiliary scanning direction for guiding the scanned medium; and a moving mechanism for moving said nip rollers toward and away from said feed drum;

said moving mechanism comprising:
   first displacing means for moving said presser guide members toward and away from said feed drum in synchronism with movement of said nip rollers toward and away from said feed drum; and
   second displacing means for moving said guide plates out of positions interfering with said presser guide members, respectively, in synchronism with movement of said nip rollers toward and away from said feed drum.

2. A feed apparatus according to claim 1, wherein said moving mechanism comprises a pair of brackets spaced a distance from each other, each of said nip rollers being rotatably supported between said brackets, and actuating means for vertically moving said brackets in unison with each other, said first displacing means comprising a pair of plates each integral with said brackets, said pressure guide members extending from said plates, respectively.

3. A feed apparatus according to claim 1, wherein said moving mechanism comprises a pair of brackets spaced a distance from each other along said feed drum and disposed parallel to each other, each of said nip rollers being rotatably supported between said brackets, and actuating means for vertically moving said brackets in unison with each other, said second displacing means comprising a pair of swing plates disposed upstream and downstream, respectively, of said feed drum in the auxiliary scanning direction, each swingably held in engagement with said brackets for angularly moving said guide plates out of said positions interfering with said presser guide members, respectively, when said nip rollers move toward said feed drum, said guide members thereby defining looped feed paths.

\* \* \* \* \*